(12) United States Patent
Skelton

(10) Patent No.: US 6,263,867 B1
(45) Date of Patent: Jul. 24, 2001

(54) STORAGE APPARATUS

(76) Inventor: Jerry L. Skelton, 4822 W. Laurie La., Glendale, AZ (US) 85302

( * ) Notice: Subject to any disclaimer, the term of this patent is extended or adjusted under 35 U.S.C. 154(b) by 0 days.

(21) Appl. No.: 09/359,483

(22) Filed: Jul. 22, 1999

(51) Int. Cl.$^7$ .............................. F24C 15/30; B60R 11/00
(52) U.S. Cl. .................. 126/37 B; 126/56; 126/25 R; 126/276; 312/302; 312/322; 248/240.1; 248/240.2; 296/37.1
(58) Field of Search ................. 126/37 B, 37 R, 126/42, 50, 52, 9 R, 9 B, 56, 57, 25 R, 337 R, 338; 312/294, 298, 300, 266, 270.1, 270.2, 270.3, 295, 302, 311, 322; 296/37.1, 37.5, 37.6, 37.13, 24.1; 248/240, 240.1, 240.2, 240.3, 291.1, 291.13

(56) References Cited

U.S. PATENT DOCUMENTS

| | | | |
|---|---|---|---|
| 2,293,496 | * 8/1942 | Egger | 312/322 |
| 2,488,431 | * 11/1949 | Parnell et al. | 126/337 R |
| 2,867,471 | * 1/1959 | Coon, Jr. | 296/37.1 |
| 3,172,632 | * 3/1965 | Borg | 248/201 |
| 3,550,892 | * 12/1970 | Propst | 248/282.1 |
| 3,550,982 | * 12/1970 | Zaidan | 312/302 |
| 3,692,351 | 9/1972 | Christopher et al. | 126/37 B |
| 4,089,554 | * 5/1978 | Myers | 296/24.1 |
| 4,347,830 | 9/1982 | Runyan | 248/292.13 |
| 4,518,189 | 5/1985 | Belt | 126/56 |
| 4,832,300 | * 5/1989 | Twellmann | 312/322 |
| 4,848,498 | * 7/1989 | Hart et al. | 296/37.5 |
| 4,969,678 | 11/1990 | Loisel | 296/37.16 |
| 5,263,467 | 11/1993 | Jones | 126/37 B |
| 5,586,546 | * 12/1996 | Ashcraft et al. | 126/37 B |
| 5,709,329 | * 1/1998 | Johnson | 296/37.5 |
| 5,950,617 | * 9/1999 | Lorenz | 126/25 R |

FOREIGN PATENT DOCUMENTS

185637  *  8/1936  (CH) .

* cited by examiner

Primary Examiner—Ira S. Lazarus
Assistant Examiner—Josiah C. Cocks
(74) Attorney, Agent, or Firm—Parsons & Goltry; Michael W. Goltry; Robert A. Parsons

(57) ABSTRACT

Storage apparatus comprising an opening leading to a compartment bound by a housing, a framework mounted to the housing for movement between a first position contained by the compartment and a second position extending from the opening, a platform carried by the framework for accommodating storage items in the first position of the framework and for holding the storage items in the compartment in the second position of the framework, and an obstruction carried by one of the framework and the platform for inhibiting storage items supported by the platform from passing through the opening in the first position of the framework.

16 Claims, 4 Drawing Sheets

STORAGE APPARATUS

FIELD OF THE INVENTION

This invention relates to storage devices and, more particularly, to a storage assembly for supporting storage items in a compartment.

BACKGROUND OF THE INVENTION

The art of storage and containment has long enjoyed considerable attention by artisans devoted to improving the ease and efficiency of storing. From the car, van and recreational vehicle to the garage, closet and kitchen, innovations in specialized shelving, cabinetry, and the discrete positioning of storage compartments currently leads the art of storage and containment. Beyond this, however, little has been done toward improving the ability to not only load storage items into a contained space, but also access the stored items once stored. To this end, the need for certain new and useful improvements is evident.

Accordingly, it would be highly desirable to a new and improved storage assembly.

It is a purpose of the invention to provide a new and improved storage assembly that is easy to construct.

It is another purpose of the invention to provide a new and improved storage assembly that is easy to use.

It is still another purpose of the invention to provide a new and improved storage assembly that is easy to install.

It is a further purpose of the invention to provide a new and improved storage assembly that is inexpensive.

It is still a further purpose of the invention to provide a new and improved storage assembly that incorporates a contained space or compartment defined by the body of a motorized or non-motorized recreational vehicle.

It is yet still a further purpose of the invention to provide a new and improved storage assembly that incorporates a gas-powered grill.

It is another purpose of the invention to increase the ease and efficiency of storing items, and to increase the ease of accessing items once stored.

It is still another purpose of the invention to reduce the frustration commonly associated with storing storage items such as luggage, boxed items, etc.

It is yet still another purpose of the invention to provide a new and improved barbecue grill apparatus.

SUMMARY OF THE INVENTION

The above problems and others are at least partially solved and the above purposes and others realized in new and improved storage apparatus for use in storing items whether for long or short terms. Storage apparatus comprises an opening leading to a compartment bound by a housing and a storage assembly mounted to the housing in the compartment. The storage assembly comprises a framework mounted to the housing for movement between a first position contained by the compartment and a second position extending from the opening. A platform is carried by the framework for accommodating storage items in the first position of the framework and for holding the storage items in the compartment in the second position of the framework. The framework is mounted for pivotal movement between the first and second positions, and the platform is preferably mounted to the framework for reciprocal movement between retracted and extended positions.

In a specific embodiment, the storage assembly may further include a supporting element or leg mounted to one of the framework and the platform for movement between a retracted position toward the framework and an extended position for engaging a supporting surface in the second position of the framework. The storage assembly may also include an obstruction for inhibiting stored or storage items supported by the platform from passing through the opening of the compartment in the first position of the framework.

BRIEF DESCRIPTION OF THE DRAWINGS

The foregoing and further and more specific objects and advantages of the invention will become readily apparent to those skilled in the art from the following detailed description taken in conjunction with the drawings in which.

DETAILED DESCRIPTION OF A PREFERRED EMBODIMENT

The present invention provides, among other things, new and improved storage apparatus for use in storing items whether for long or short terms. Ensuing embodiments are easy to construct, easy to use, and provide users with useful structure which facilitates not only easy placement of storage items into an enclosure or compartment, but also easy access to the items after storage.

Figure 1:
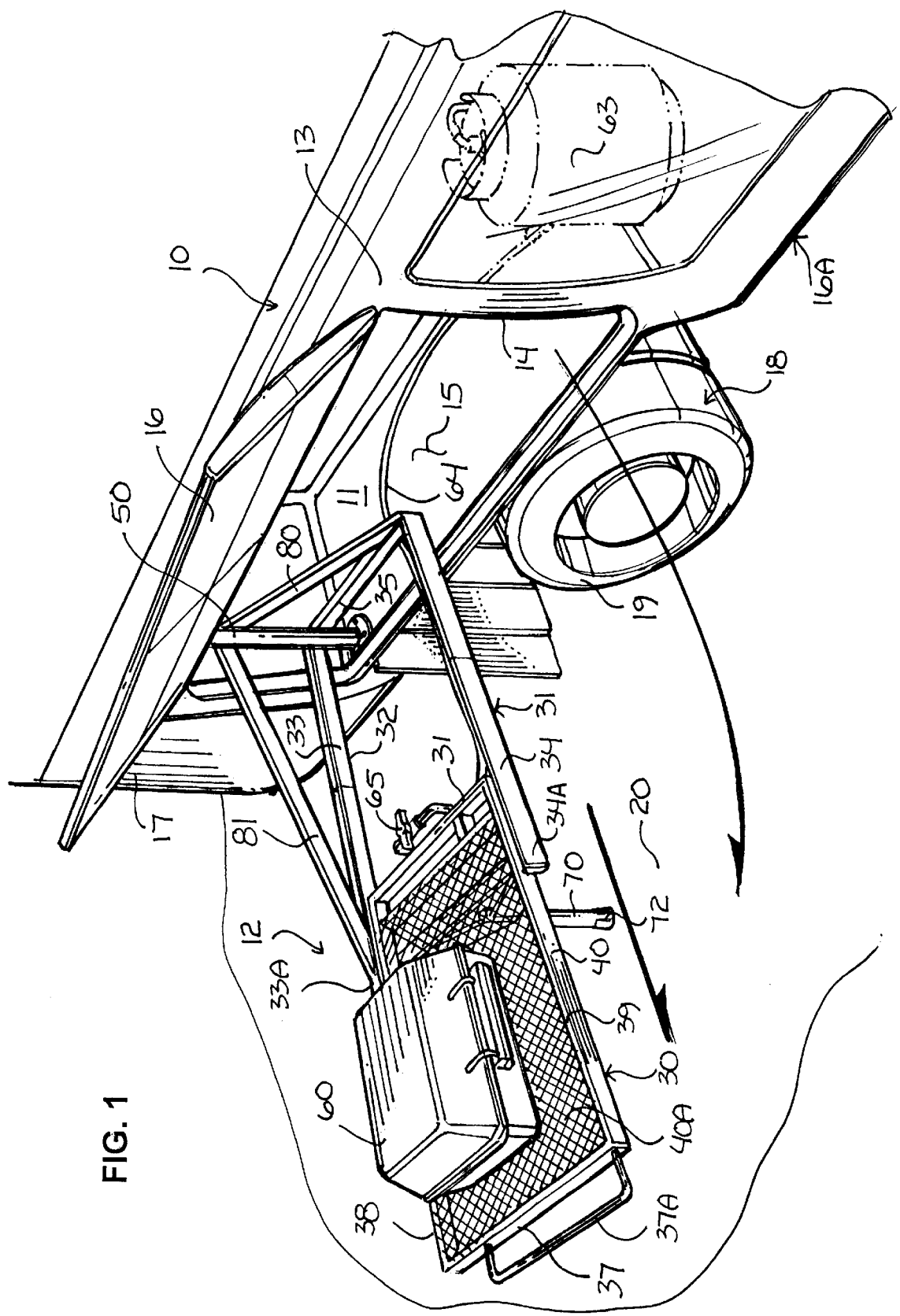
FIG. 1 is a perspective view of storage apparatus comprising a compartment bound by a housing and a storage assembly mounted to the housing for movement between a position contained by the compartment and another position extending from the compartment, the storage assembly having a leg mounted for movement between a retracted position and an extended position for engaging a supporting surface when extending from the compartment and shown as it would appear supporting a grill coupled to a fuel source.
Figure 4:
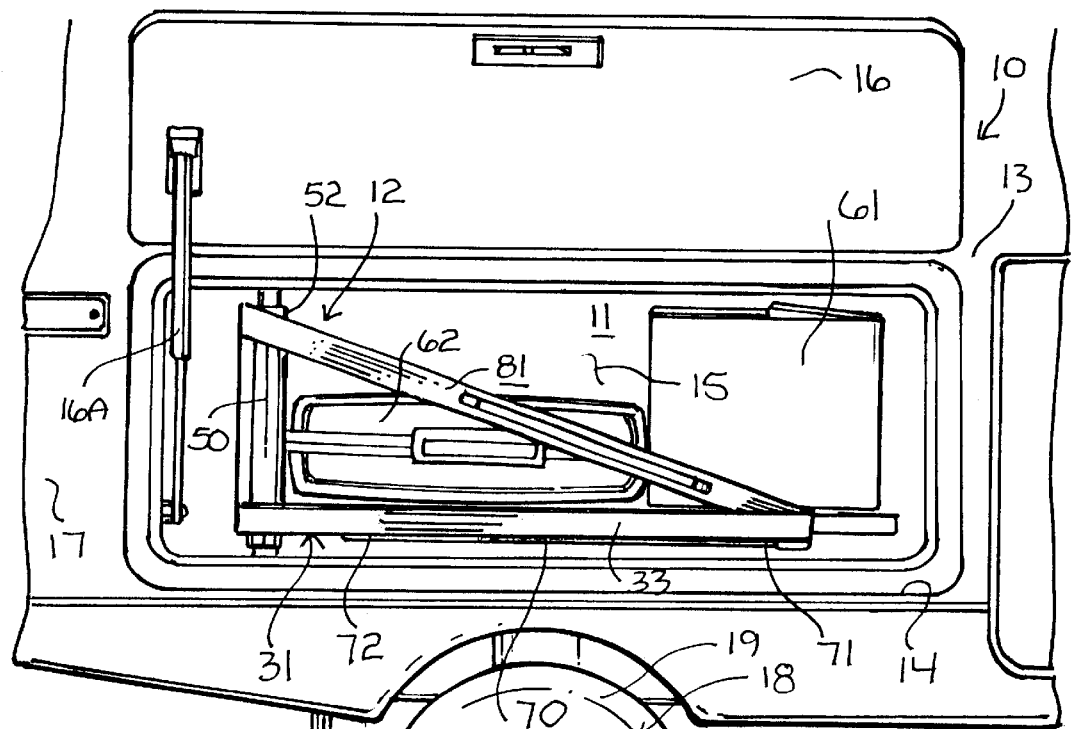
FIG. 4 is a side view showing the storage assembly as it would appear supporting storage items in the compartment.

Turning to the drawings, in which like reference characters indicate corresponding elements throughout the several views, FIG. 1 illustrates a perspective view of storage apparatus 10 comprising a compartment 11 and a storage assembly 12. Compartment 11 is bound or otherwise defined by a housing 13 which further defines a continuous rim 14 that bounds an opening 15 leading to compartment 11. A lid 16 is mounted to housing 13 for movement between a closed position enclosing opening 15 and an open position extending away from housing 13 exposing opening 15. In FIG. 4, a conventional cylinder assembly 16A interconnects lid 16 to housing 13 for bearing the weight of lid 16 as it is moved between its open and closed positions. Lid 16 can be mounted to housing for sliding or reciprocating movement, but is preferably mounted to housing 13 for pivotal or hinged movement. opening 15 defines or otherwise resides in a substantially vertical plane. Compartment 11 and its described components including housing 13, continuous rim 14 and opening 15, may collectively comprise a free standing structure, a component of cabinetry or other built indoor or outdoor structure, or, perhaps, a storage component of, as shown in FIG. 1, a motorized or non-motorized recreational vehicle 16A. In FIG. 1, recreational vehicle 16A is shown only in fragmented perspective view, and is comprised of a body 17 supported by a wheeled chassis 18. Body 17 is intended to define housing 13, which, of course, bounds compartment 11. Compartment 11 is shown positioned for external access above a rear wheel 19 of recreational vehicle 16A adjacent the ground or supporting surface 20. Those having regard to the art will appreciate that compartment 11 can be located at other positions along recreational vehicle 16A for external access and, perhaps, inside the body 17 of recreational vehicle is so desired.

Storage assembly 12 is preferably constructed of steel, aluminum, plastic or the like, and is mounted to housing 13 in compartment 11 for pivotal movement between a first position contained by compartment 11 (FIG. 4), and a second position extending from opening 15 away from compartment 11 (FIG. 1). In other words, storage assembly is mounted to portions of the structure of housing 13 that bounds compartment 11, further details of which will be discussed in greater detail as this specification ensues. Regarding FIG. 1, storage assembly 12 is comprised of a platform or shelf 30 carried by a framework 31 that is mounted to housing 13. Framework 31 is the support for platform 30, which defines a plane that intersects the plane of opening 15 in a substantially perpendicular orientation. In the present embodiment, framework 31 is comprised of a U-shaped support 32 having rails 33 and 34 coupled to and extending outwardly from or adjacent ends of an elongate member 35. Rails 33 and 34 are spaced apart in substantially parallel relation and terminate outwardly or away from elongate member 35 with free or outer ends 33A and 34A, respectively. For additional structural support, ends 33A and 34A may be coupled together with an elongate structure support. Platform 30 is comprised of a substantially rectangular planar member 40 mounted to rails 33 and 34 for reciprocal, sliding movement between a retracted position (FIG. 2) toward elongate member 35 and an extended position (FIG. 3) away from elongate member 35 extending from free ends 33A and 34A of rails 33 and 34.

Figure 3:
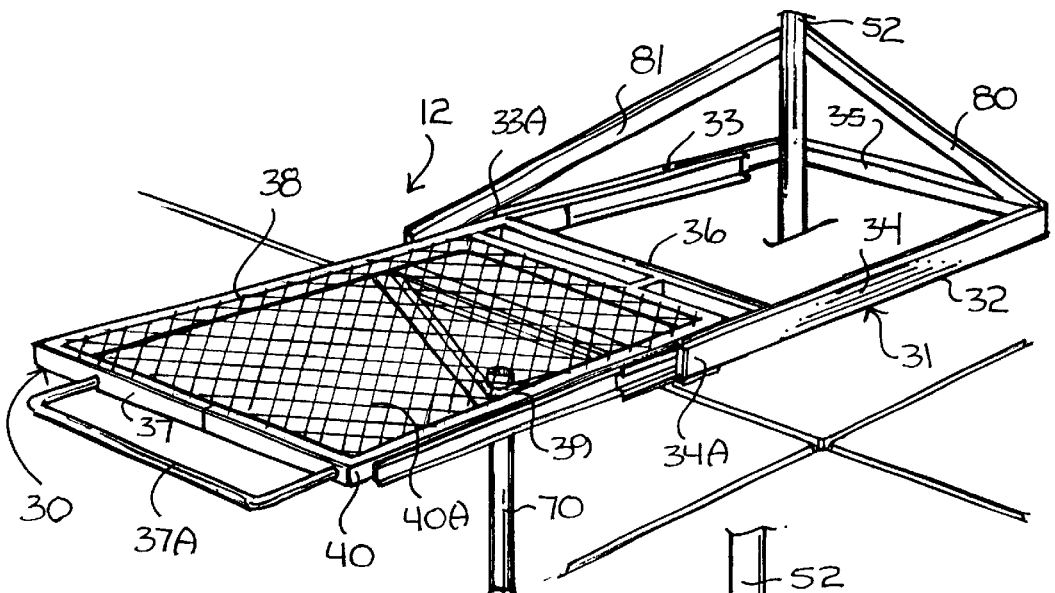
FIG. 3 is a perspective view of the storage assembly of FIG. 1 shown as it would appear in an extended condition.
Figure 2:
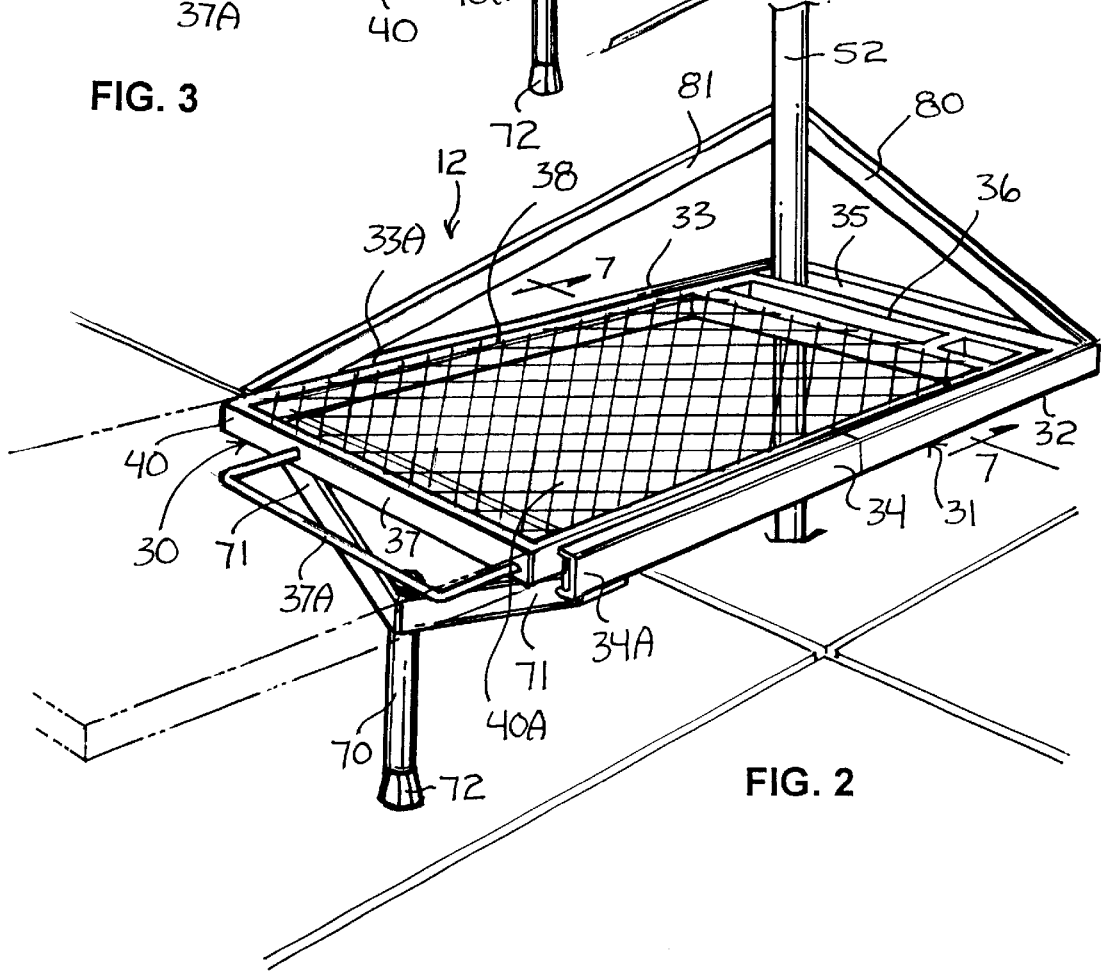
FIG. 2 is a perspective view of the storage assembly of FIG. 1 shown as it would appear in a retracted condition.
Figure 7:
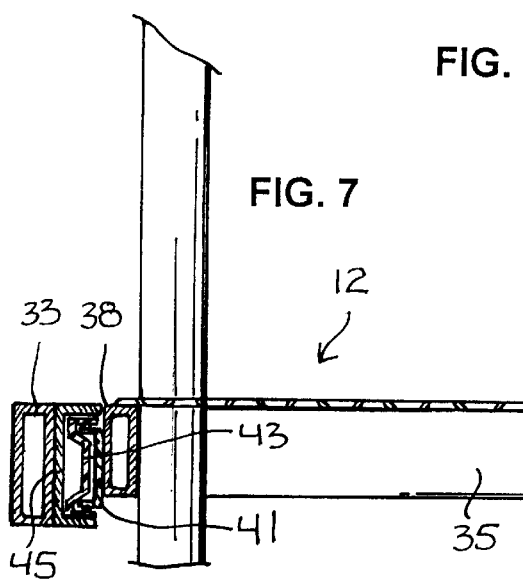
FIG. 7 is a sectional view taken along line 7—7 of FIG. 2.

Regarding FIGS. 1–3, planar member 40 defines a proximal extremity 36 directed toward elongate member 35, an opposing distal extremity 37, opposing lateral or side extremities 38 and 39 that extend between the proximal and distal extremities 36 and 37, and a support surface 40A for accommodating storage items. Turning to FIG. 7 illustrating a sectional view taken along line 7—7 of FIG. 2, lateral extremities 38 and 39 support tracks 41 and 42, respectively. Tracks 41 and 42 oppose one another and extend outwardly and along substantially the entire length of planar member 40 from proximal extremity 36 to distal extremity 37, and are fixed in place with screws, rivets, an adhesive, welding, or other suitable fastening apparatus. Tracks 41 and 42 are captured for sliding movement in elongate ways 43 and 44, respectively. Ways 43 and 44 are captured for sliding movement to base tracks 45 and 46, respectively, each of which are fixed to rails 33 and 34, respectively, of framework 31. Like tracks 41 and 42, base tracks 45 and 46 are fixed in place with screws, rivets, an adhesive, welding, or other suitable fastening apparatus. The tracks 41 and 42, ways 43 and 44 and base tracks 45 and 46 allow planar member 40 to be moved in reciprocal directions between its retracted and extended positions, and represents a track and way structure commonly found with conventional desk drawers, kitchen drawers, etc. Distal extremity 37 supports a handle 37A that a user may grasp for moving planar member 40 upon application of a manual force. The invention may incorporate a motor (such as an electrical motor) for providing movement of planar member 40 in reciprocal directions upon actuation if so desired. Other means of mounting planar member to framework 31 for reciprocal movement may be employed, and are intended to be included within the scope of this invention. When platform 30 is in its retracted position, the storage assembly 12 is deemed in a retracted condition, and when platform 30 is in its extended position, the storage assembly 12 is deemed in an extended condition.

As indicated above, storage assembly 12 is fixed to housing 13 for pivotal movement between a first position contained by compartment 11 and a second position extending from opening 15 away from compartment 11 (FIG. 1). In the present embodiment, compartment 11 is sized so that only with platform 30 in its retracted position can 1) compartment 11 contain storage assembly 12, and 2) storage assembly 12 be moved pivotally between its first and second positions. As a result, only when storage assembly 12 is in its second position can platform 30 be moved into its extended position. Should a user desire, compartment 11 and/or storage assembly 12 can be designed to permit movement of storage assembly 12 between its first and second positions in both its retracted and extended conditions, and to permit movement of storage assembly 12 between its retracted and extended conditions while contained by the compartment 11.

Figure 6:
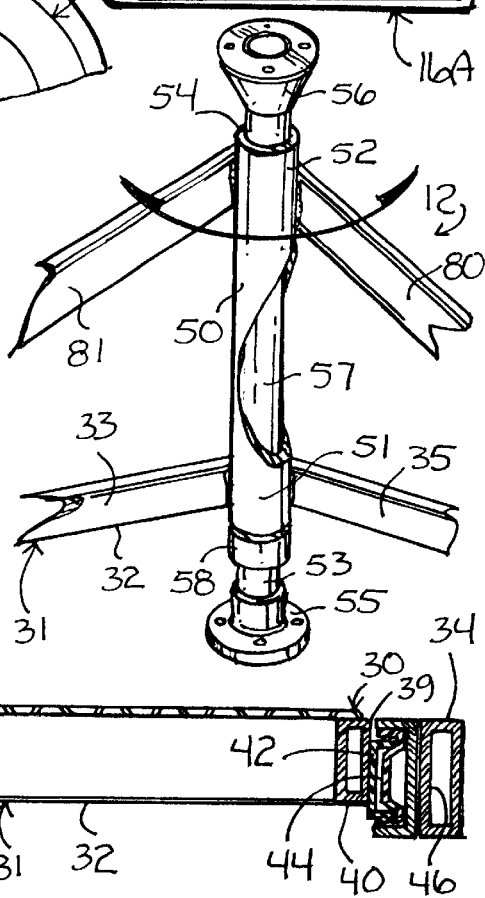
FIG. 6 is a fragmented perspective view of the storage assembly of FIG. 1 showing structure for coupling the storage assembly to the housing of FIG. 1.

To mount storage assembly 12 to housing 13, and to provide for pivotal movement, framework 31 includes an upstanding tubular sleeve 50 fixed to U-shaped support 32 by welding, rivets, screws or other suitable fastening structure. Consistent with the ensuing discussion, sleeve 50 may be fixed to U-shaped support 32 at any suitable position for allowing pivotal movement of storage assembly 12 between its first and second positions. In a preferred embodiment, sleeve 50 is fixed to U-shaped support 32 at or adjacent the intersection of elongate member 35 and rail 33. Turning to FIG. 6, sleeve 50 includes an open lower or proximal end 51 and an open upper or distal end 52. U-shaped support 32 is fixed to sleeve 50 intermediate its open proximal and distal ends 51 and 52, yet more toward open proximal end 51. A column 57 passes through sleeve 50 and includes a free end 53 extending outwardly from the open proximal end 51. Column 57 extends upwardly from free end 53 and terminates with another free end 54 extending outwardly from the open distal end 52. Free ends 53 and 54 support collars 55 and 56, respectively, that each engage or are engagable to housing 13 at compartment 11 by way of welding, screws, rivets, etc. Free ends 53 and 54 may be fixed to housing 13 at compartment 11 directly if so desired. Sleeve 50 is sized to rotate or pivot about column 57. With column 57 mounted to housing 13 at compartment 11, open proximal end 51 seats against a stop 58 supported by column 57.

When properly mounted to housing 13 as shown in FIG. 1, sleeve 50 stands upright at a location in compartment 11 adjacent opening 15 and one side of compartment 11 so that storage assembly 12 can be moved pivotally about column 57 (not shown in FIG. 1) between its first and second positions. In the second position of storage assembly 12, support surface 40A of platform 30 may be loaded with storage items such as one or more boxes, suitcases, books, a barbecue grill 60 as shown, tool boxes, storage containers, storage drawers, etc. Prior to loading, platform 30 can be moved into its extended position away from housing 13 and lid 16 to allow a user more convenient access to platform 30 for loading. After loading, platform 30 may be moved into its retracted position, storage assembly 12 moved into its first position contained by compartment 11 for supporting the storage items in compartment 11 and lid 16 moved to its closed position to enclose opening 15. In FIG. 4, the stored items shown comprise a box 61 and a suitcase 62. Should one need to access one or more of the stored items, lid 16 may be moved to its open position to expose opening 15 and storage assembly 12 moved from its first position to its second position for allowing easy and convenient access to the stored items.

Platform 30 provides for an especially convenient storage place for barbecue grill 60. For convenience, grill 60 can be coupled in fuel communication to a propane fuel source 63 (shown in FIG. 1 in dotted outline) via a fuel line 64. Although fuel source 63 may be positioned outside of housing, housing 13 may be adapted or designed to contain fuel source 63, with fuel line 64 leading from fuel source 63 to grill 60 by way of compartment 11. For further convenience, a conventional manually operable valve 65 can be fixed either to the framework 31 or to the platform 30 for allowing a user to turn the fuel supply ON and OFF as needed. In FIG. 1, valve 65 is shown as it would appear coupled to the proximal extremity 36 of platform 30, although it may be coupled at other locations.

Figure 5:
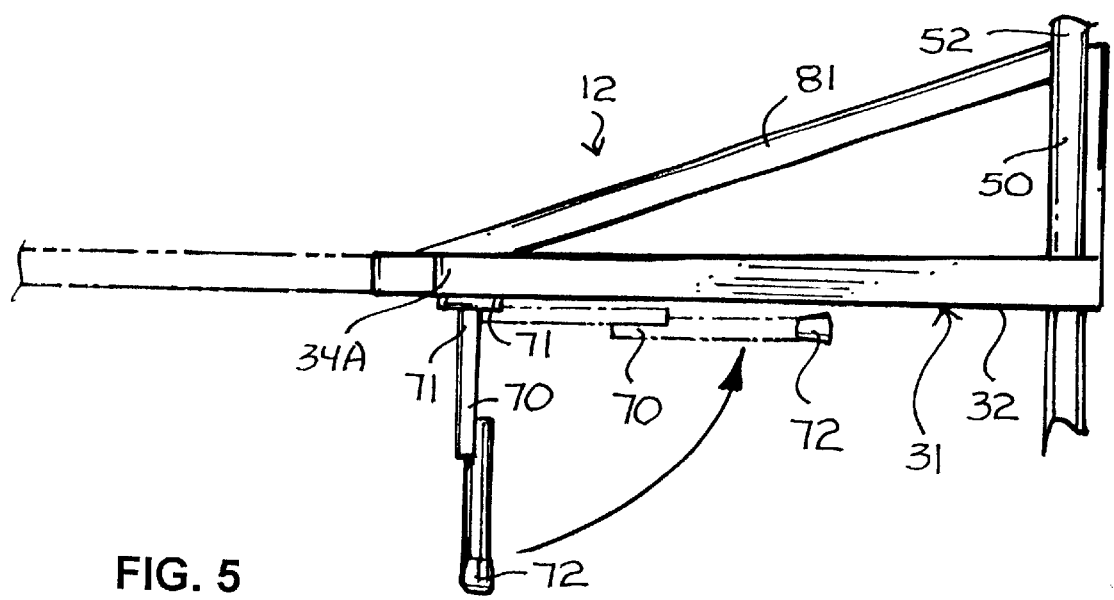
FIG. 5 is a side view of the storage assembly of FIG. 1 with the leg shown as it would appear in its extended position.

Storage assembly 12 may further include an elongate support element or leg 70. Regarding FIG. 2, leg 70 is elongate and includes or otherwise defines an inner end 71 and an outer end 72. Inner end 71 is shown mounted hingedly in a conventional manner to framework 31 for pivotal movement between a retracted position and an extended position. In the retracted position shown in FIG. 4 and in dotted outline in FIG. 5, leg 70 resides against framework 31 and platform for allowing storage assembly 12 to be moved pivotally between its first position contained in compartment 11 and its second position. The extended position of leg 70 engages outer end 72 against the ground or supporting surface 20 (shown only in FIG. 1) in the second position of storage assembly 12 for providing structural support to storage assembly 12 in its second position and in its extended condition. In FIG. 2, inner end 71 is shown as it would appear mounted to rails 33 and 34 adjacent free ends 33A and 34A. In an alternate embodiment, leg 70 may be mounted to platform 30.

The invention has been described above with reference to one or more preferred embodiments. However, those skilled in the art will recognize that changes and modifications may be made in the described embodiments without departing from the nature and scope of the invention. For instance, collars 55 and 56 may be threadably or otherwise adjustably mounted to the free ends 53 and 54 of column 57 and/or column 57 provided as an adjustable cylinder assembly, for allowing a user to install or retrofit storage assembly 12 to an existing compartment. Furthermore, the invention may include one or more locking structures for use in locking storage assembly 12 in its first and/or second positions, for locking platform 30 in its retracted and/or extended positions, and for locking leg 70 in its retracted and/or extended positions. Regarding FIGS. 1–3, framework 31 preferably includes an elongate structural support 80 fixed to and interconnecting open distal end 52 of sleeve 50 and elongate member 35 at a point approximately where it meets rail 35, and an elongate structural support 81 fixed to and interconnecting open distal end 52 of sleeve and rail 33 at a point at or adjacent its free end 33A. In one aspect, elongate structural supports 80 and 81 provide for an additional support and engagement of framework 31 to sleeve 50. Furthermore, with storage items held by platform 30 and storage assembly 12 positioned in its first position contained by compartment, elongate structural support 81 is positioned to serve as an obstruction, which substantially inhibits items held or supported by platform 30 from inadvertently falling outwardly from compartment 11 through opening 15. If compartment 11 forms part of a recreational or conventional motorized vehicle, items supported by storage assembly 12 can move about during travel. As a result, elongate structural support 81 is desirable as it obstructs opening and inhibits stored items from falling outwardly through opening 15 when lid 16 is moved to its open position as shown substantially in FIG. 4. Additional obstructive structure may be incorporated with elongate structural support 81 as needed consistent with this discussion.

Various changes and modifications to one or more of the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. Storage apparatus comprising:
    an opening leading to a compartment bound by a housing;
    a framework mounted to the housing for pivotal movement between a first position contained by the compartment and a second position extending away from the compartment through the opening;
    a storage platform mounted to the framework for reciprocal movement between a retracted position toward the framework and an extended position away from the framework;
    a fuel source contained by the housing; and
    a grill carried by the storage platform and coupled in fuel communication to the fuel source.

2. Storage apparatus of claim 1, wherein the framework includes a sleeve mounted to a fixed support for pivotal movement between the first and second positions.

3. Storage apparatus of claim 1, wherein the storage platform is supported by rails of the framework.

4. Storage apparatus of claim 1, the opening defining a plane, wherein the storage platform defines a plane that intersects the plane defined by the opening.

5. Storage apparatus of claim 1, further including a leg mounted to one of the framework and the storage platform for movement between a retracted position toward the framework and an extended position for engaging a supporting surface in the second position of the framework.

6. Storage apparatus comprising:
    an opening leading to a compartment bound by a housing;
    a framework mounted to the housing for pivotal movement between a first position contained by the compartment and a second position extending away from the compartment through the opening;
    a storage platform mounted to the framework for reciprocal movement between a retracted position toward the framework and an extended position away from the framework; and
    an obstruction carried by one of the framework and the storage platform for inhibiting storage items supported by the storage platform from passing through the opening in the first position of the framework.

7. Storage apparatus of claim 6, wherein the framework includes a sleeve mounted to a fixed column for pivotal movement between the first and second positions.

8. Storage apparatus of claim 6, wherein the storage platform is supported by rails of the framework.

9. Storage apparatus of claim 6, the opening defining a plane, wherein the storage platform defines a plane that intersects the plane defined by the opening.

10. Storage apparatus of claim 6, further including a leg mounted to one of the framework and the storage platform for movement between a retracted position toward the framework and an extended position for engaging a supporting surface in the second position of the framework.

11. In a housing including a compartment having an opening and a lid mounted to the housing for movement between a closed position enclosing the opening and an open position exposing the opening, a storage assembly comprising:

a framework mounted to the housing for pivotal movement between a first position contained by the compartment and a second position extending away from the compartment through the opening;

a storage platform mounted to the framework for reciprocal movement between a retracted position toward the framework and an extended position away from the framework;

a fuel source contained by the housing; and a grill carried by the storage platform and coupled in fuel communication to the fuel source.

12. The storage assembly of claim 11, wherein the framework includes a sleeve mounted to a fixed support for pivotal movement between the first and second positions.

13. The storage assembly of claim 11, wherein the storage platform is supported for reciprocal movement by rails of the framework.

14. The storage assembly of claim 11, the opening defining a plane, wherein the storage platform defines a plane that intersects the plane defined by the opening.

15. The storage assembly of claim 11, further including a leg mounted to one of the framework and the storage platform for movement between a retracted position toward the framework and an extended position for engaging a supporting surface in the second position of the framework.

16. The storage assembly of claim 11, further including a valve carried by one of the framework and the storage platform for regulating the flow of fuel from the fuel source to the grill.

\* \* \* \* \*